United States Patent
Whitmore

(10) Patent No.: US 6,805,475 B2
(45) Date of Patent: Oct. 19, 2004

(54) SIGNALING WIRING ASSEMBLY FOR A VEHICLE

(76) Inventor: Kenneth C. Whitmore, 1605 S. Parkway Blvd., Suite 110, Sugar Land, TX (US) 77478

( * ) Notice: Subject to any disclaimer, the term of this patent is extended or adjusted under 35 U.S.C. 154(b) by 0 days.

(21) Appl. No.: 10/180,090

(22) Filed: Jun. 27, 2002

(65) Prior Publication Data

US 2003/0002293 A1 Jan. 2, 2003

Related U.S. Application Data

(60) Provisional application No. 60/301,123, filed on Jun. 28, 2001.

(51) Int. Cl.[7] ................................................ B60Q 1/34
(52) U.S. Cl. ........................ 362/495; 362/540; 340/475
(58) Field of Search ................................. 362/495, 540, 362/498, 496, 487, 506, 541, 542, 459; 340/475, 332, 468, 472

(56) References Cited

U.S. PATENT DOCUMENTS

| 5,764,141 A | * | 6/1998 | Chang | 340/472 |
| 6,382,819 B1 | * | 5/2002 | McQuiston | 362/495 |
| 6,466,128 B1 | * | 10/2002 | Pan | 340/468 |
| 6,538,567 B2 | * | 3/2003 | Stewart | 340/475 |

* cited by examiner

Primary Examiner—Thomas M. Sember
Assistant Examiner—B Q Truong
(74) Attorney, Agent, or Firm—Dickstein Shapiro Morin & Oshinsky LLP

(57) ABSTRACT

A wiring assembly that is electronically connected in line with the existing running board courtesy lamp system of, for example, a Ford Expedition, Ford Excursion, Ford King Ranch or Lincoln Navigator, which causes one or more lamps on the running board to flash when the turn signal of the vehicle is activated.

9 Claims, 4 Drawing Sheets

SIGNALING WIRING ASSEMBLY FOR A VEHICLE

This application claims the benefit of U.S. Provisional Application No. 60/301,123, filed Jun. 28, 2001.

FIELD OF THE INVENTION

The present invention relates to automotive accessories and, in particular, to a signaling wiring assembly for vehicles.

BACKGROUND OF THE INVENTION

Vehicle running boards provide a convenient way to facilitate the entry and exit of a vehicle. Running boards typically extend from the front of the rear wheel to the back of the front wheel. As part of the courtesy lamp system of a vehicle, manufacturers have provided vehicle running boards with lighting assemblies which cause the running board to be illuminated when the vehicle doors are manually opened or ajar, or when the vehicle is unlocked by using a wireless remote. Typically, such lighting assemblies on the running board include elongated light strips formed of a flexible polymer tube having small bulbs electrically connected in parallel through the tube. A conventional running board with a lighting assembly disposed on the outer-side or under-side of the running board is described, for example, in U.S. Pat. No. 4,557,494 to Elwell, the disclosure of which is incorporated by reference herein.

As travel safety is becoming increasingly important, vehicle manufacturers have added various features for enhancing visibility and safety, including supplemental lights for increasing the visibility of motor vehicles and for indicating vehicular braking and turn signaling. In this regard, although factory installed lights on vehicle running boards are included on many vehicles as part of the courtesy lamp system, it would be desirable to utilize one or more of those lights on the running board to provide a turn signal indication on the running boards to improve turn signaling visibility from the side of the vehicle.

SUMMARY OF THE INVENTION

The invention achieves the foregoing objective by providing a wiring light assembly for a vehicular running board that adapts an existing running board lighting system to provide an indication of vehicular turn signaling. The wiring light assembly of the present invention accordingly increases side visibility when the vehicle is turning left or right, or is changing lanes left or right, by causing existing courtesy lamps on the running board of the vehicle to flash in synchronism with the designated turn signal.

More specifically, the invention provides a wiring light assembly which is electronically connected in line, without the need to cut wires, with the existing vehicular wiring to the courtesy lamps on the running boards of motor vehicles, for example, Ford or Lincoln vehicles such as Ford Expedition, Ford Excursion, Ford King Ranch or Lincoln Navigator.

The wiring light assembly of the present invention is installed in series with an existing courtesy lamp circuit, and uses the electrical current of the existing courtesy lamp circuit, together with the existing electrical turn signals of the motor vehicle, to cause one or more of the lamps on the running board to blink to indicate a designated vehicle turn signal. Accordingly, the present invention allows a motor vehicle with courtesy lamps on the running boards to be easily retrofitted so as to provide turn signal indication, which is particularly useful when the vehicle is changing lanes. The present invention is furthermore designed such that, when the hazard lights of the vehicle are flashing, the running board lamps flash in synchronism with the other flashing lights.

These and other features and advantages of the invention will be more apparent from the following detailed description that is provided in connection with the accompanying drawings and illustrated exemplary embodiments of the invention.

DETAILED DESCRIPTION OF THE PREFERRED EMBODIMENT

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The present invention relates to a wiring light assembly that is electrically connected in line with a running board light system of a pre-existing courtesy lamp system, for example, a courtesy lamp system for Ford Expedition, Ford Excursion, Ford King Ranch and Lincoln Navigator, which adds turn signal indication capability to the running boards without affecting the normal function of the courtesy lamp system.

Figure 1:
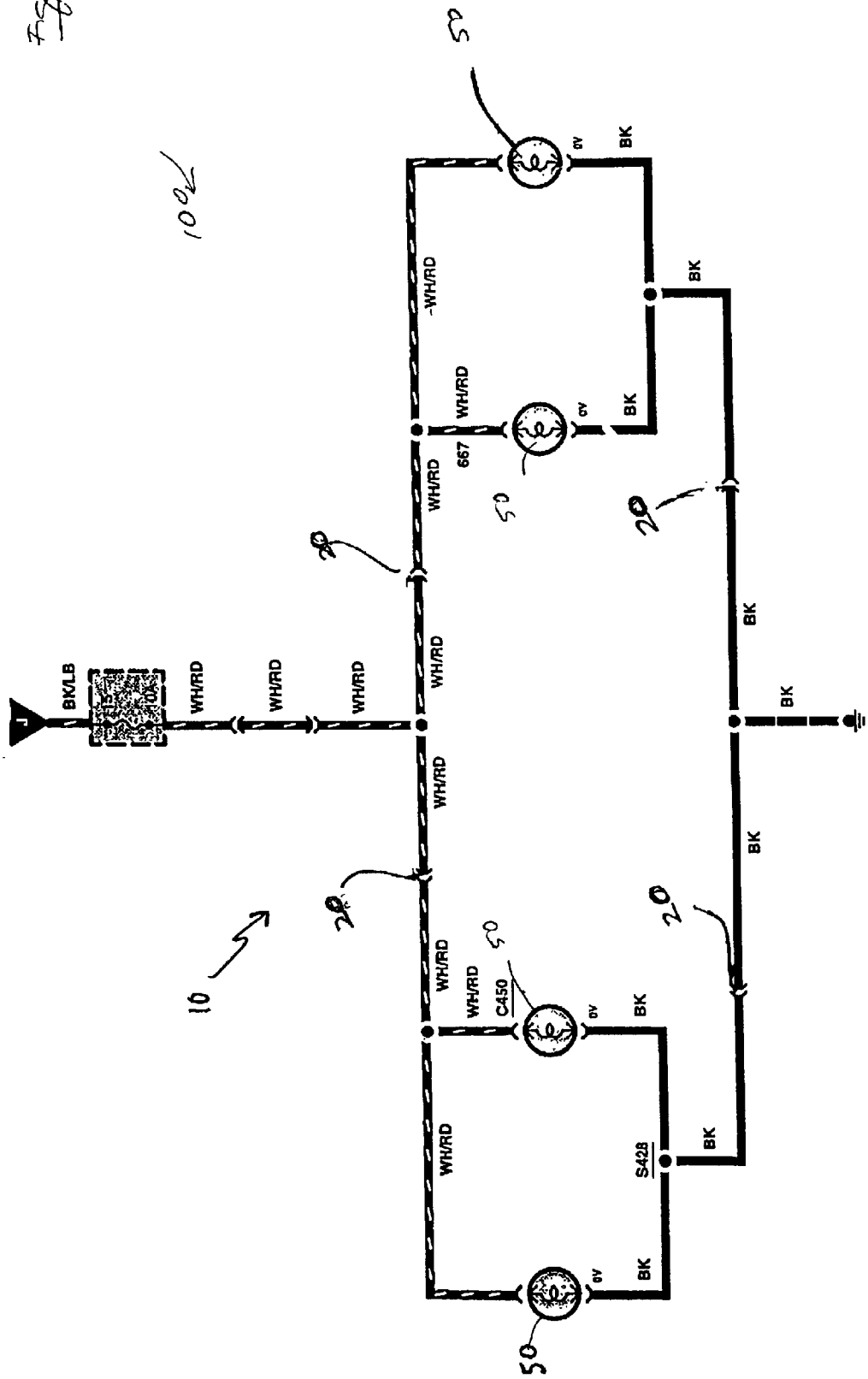
FIG. 1 illustrates an electrical circuit schematic of a typical running board courtesy lighting system, showing where the light wiring assembly according to an embodiment of the present invention is connected.

Referring now to the drawings, where like elements are designated by like reference numerals, FIG. 1 illustrates an exemplary courtesy lamp wiring diagram 10 showing the points at which the wiring assembly 20 of the present invention is connected, to form a retrofitted wiring assembly 100. In a preferred embodiment of the invention as shown in FIG. 1, the invention is connected to the pre-existing courtesy lamp system 10 of a Ford Expedition, a Ford Excursion or a Lincoln Navigator.

As known in the art, each of the Ford Expedition, Ford Excursion, Ford King Ranch and Lincoln Navigator vehicles has a courtesy lamp system, such as the courtesy lamp system 10 of FIG. 1, which operates to illuminate the interior dome lights and the running boards of the vehicle when the doors are manually opened or ajar, or when the vehicle is unlocked by using a wireless remote, for example.

Figure 2:
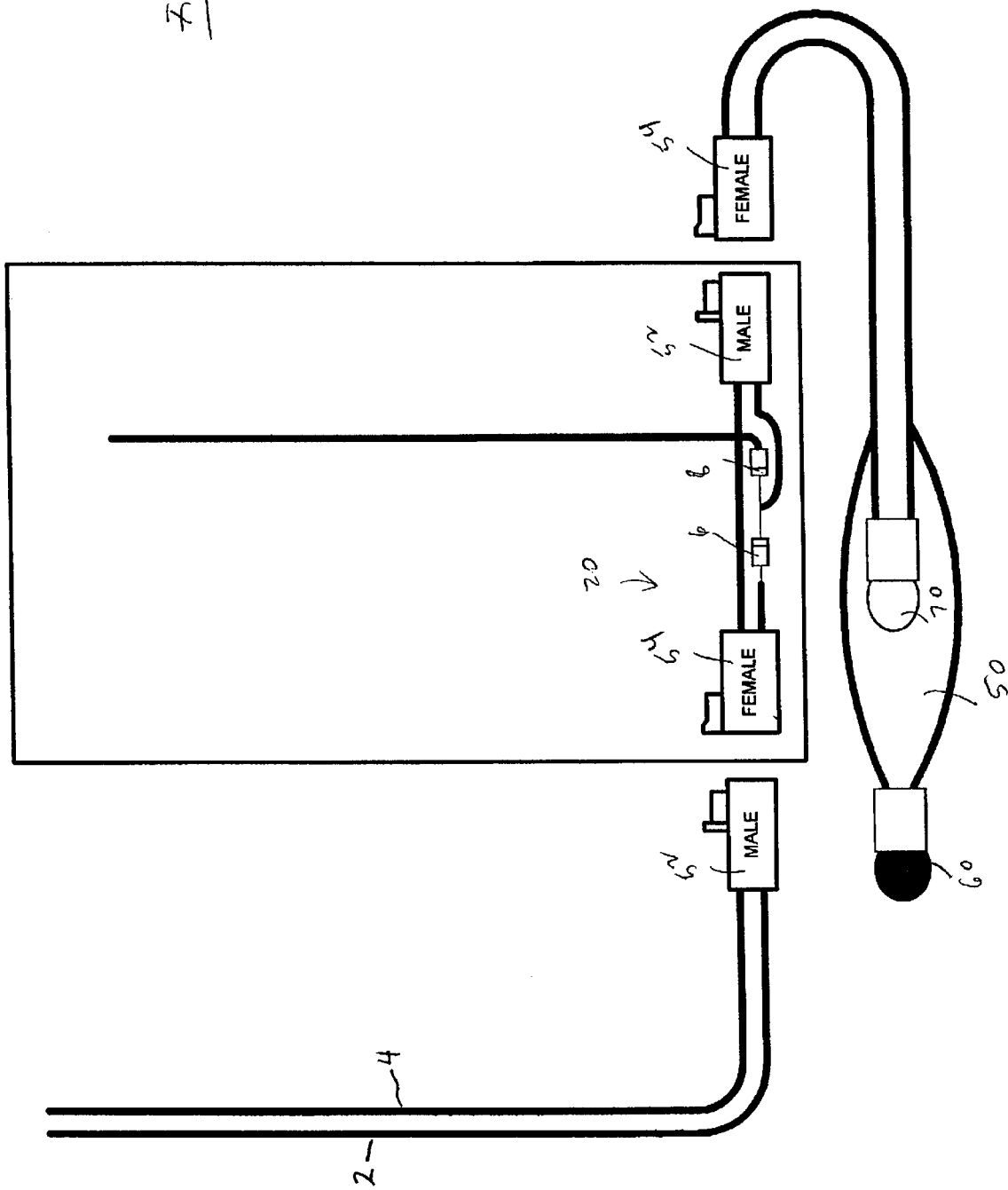
FIG. 2 illustrates the connection of the light wiring assembly of the present invention to the courtesy lamp system on one side of the motor vehicle.

As illustrated in FIGS. 1–2, the wiring assembly 20 of the present invention is electrically connected in series with hot and ground courtesy lamp wires 2 and 4, respectively, of the pre-existing courtesy lamp system 10. The hot and ground courtesy lamp wires 2, 4 are further electrically connected to respective running board lamps 50 located on each side of the vehicle. For simplicity, FIG. 2 illustrates the circuitry on only one side of the vehicle, for example, the left side. One wiretap of the wiring light assembly 20 is used on each side of the vehicle, the one on the left side tapping into the left turn signal wire at the front of the vehicle, and the one on the right side tapping into the right turn signal wire at the front of the vehicle.

Advantageously, the running board lights 50 (FIG. 2) of the wiring light assembly 20 are provided with male and female coupling connectors 52 and 54, respectively, such that no cutting of any vehicle wires is required to install the wiring assembly of the present invention. Since the circuitry of the present invention uses running board lamps for signaling, the color of the bulbs in the running board lamps 50 located on the running boards (each running board has two bulbs 60, 70) is changed to amber.

Figure 3:
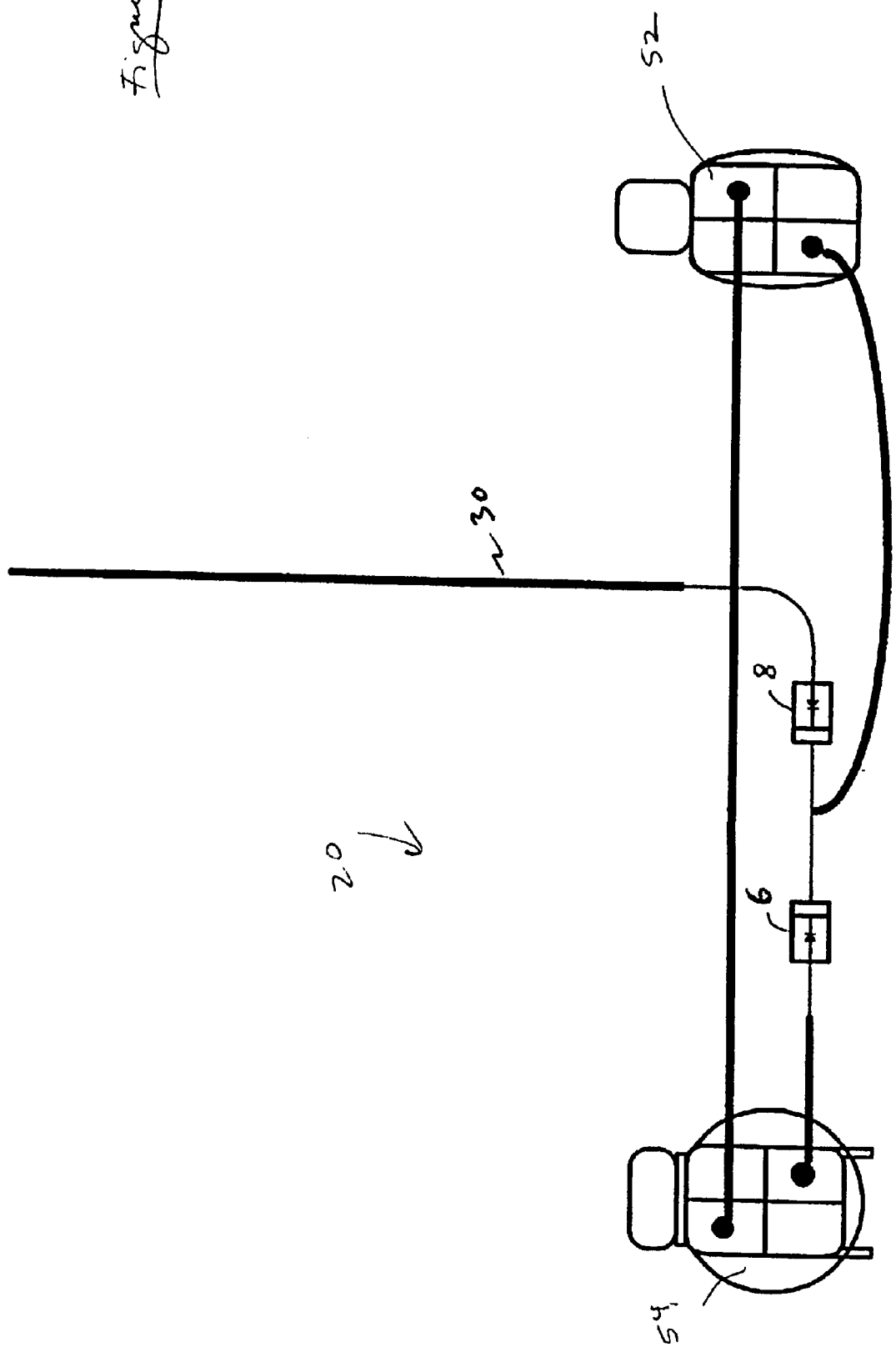
FIG. 3 is an enlarged view of light wiring assembly of the present invention shown in FIG. 2.

FIG. 3 illustrates in detail diodes 6 and 8 of the wiring assembly 20. Diode 6 is connected to the vehicle courtesy lamp system via connector 54 and is oriented so as to prevent the other vehicle courtesy lamps from flashing when the turn signal is activated. In similar fashion, diode 8 is connected to the turn signal circuitry 30 of the motor vehicle and is oriented so as to prevent the other vehicle turn signal lamps from illuminating when the courtesy lamps are activated, for example, when a door is opened. With this arrangement, the running board lamps 50 provide the dual function of serving as courtesy lamps and turn signals for the running boards, without affecting any other lights on the vehicle.

Figure 4:
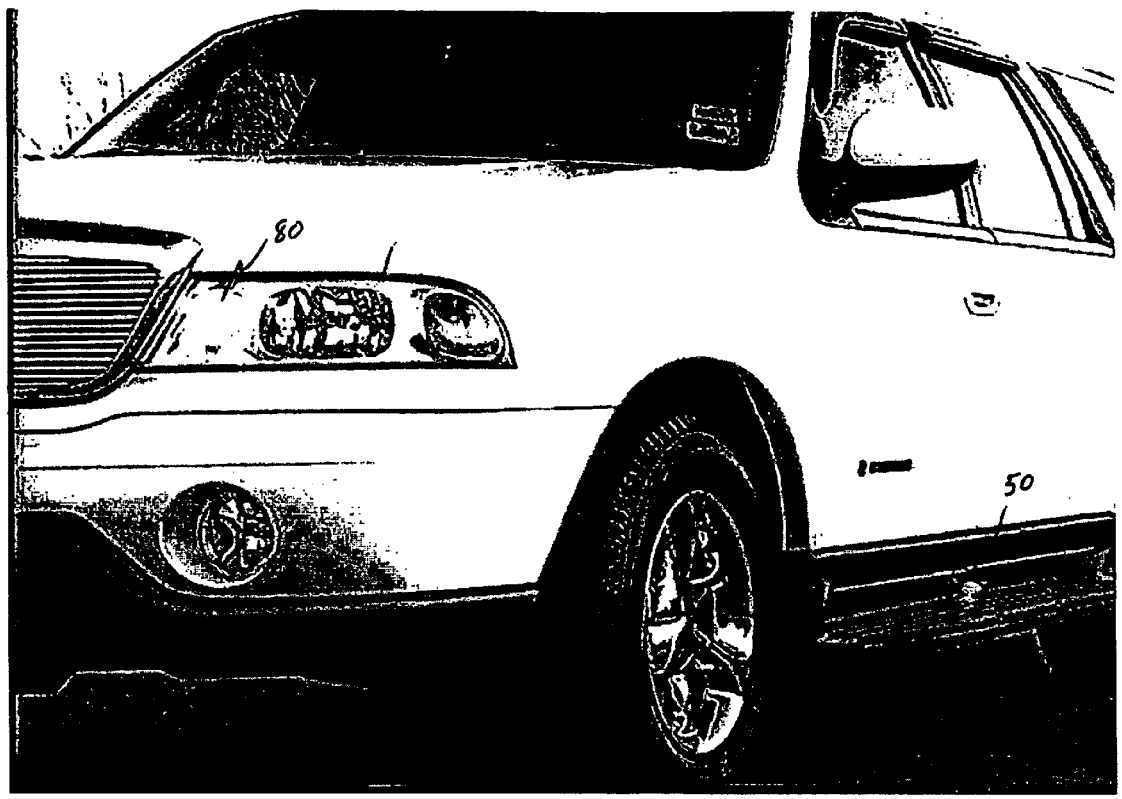
FIG. 4 is a perspective view of a motor vehicle, showing the courtesy lamp on driver's side running board flashing in synchronism with the front driver's side turn signal in accordance with the present invention.

The retrofitted light wiring assembly 100 of the present invention increases side visibility when the vehicle is turning left or right, or is changing lanes left or right, by causing the existing courtesy lamps 50 on the running board to flash in synchronism with the designated turn signal 80, as shown in FIG. 4. As described above, by employing two diodes that direct the electrical current though an existing courtesy lamp system of a vehicle, the retrofitted light wiring assembly 100 of the invention is designed so that, when the running board and signal lights are flashing, the interior courtesy lamps do not flash, and when the vehicle is unlocked with the wireless remote, or the doors are open or ajar, the turn signals lights do not illuminate. Similarly, when the hazard flashers are engaged, the running board lamps flash in synchronism with the other flashing lights.

The above description and drawings are only to be considered illustrative of exemplary embodiments, which achieve the features and advantages of the invention. Modification and substitutions to specific process conditions and structures can be made without departing from the spirit and scope of the invention. Accordingly, the invention is not to be considered as being limited by the foregoing description and drawings, but is only limited by the scope of the appended claims.

What is claimed as new and desired to be protected by Letters Patent of the United States is:

1. A retrofitted light wiring assembly for a motor vehicle, comprising:
   at least one running board provided on a side of said motor vehicle;
   an existing courtesy lamp system including lamps on the at least one running board of said motor vehicle; and
   a wiring assembly electrically connected to said courtesy lamp system comprising at least a first diode, a second diode, a male connector and a female connector, for electrically connecting a turn signal circuitry of said motor vehicle to the existing courtesy lamp system of said motor vehicle, such that at least one running board lamp of said existing courtesy lamp system flashes when the turn signal of the motor vehicle is activated.

2. The retrofitted light wiring assembly of claim 1, wherein said motor vehicle is Ford Expedition, Ford Excursion, Ford King Ranch or Lincoln Navigator.

3. The retrofitted light wiring assembly of claim 1, wherein said first diode is connected and oriented so as to allow current from the courtesy lamp system of said motor vehicle to pass through the wiring assembly to activate the at least one running board lamp of the courtesy lamp system without allowing a turn signal of said motor vehicle to pass back through the wiring assembly to the courtesy lamp system to cause other lamps of the courtesy lamp circuitry to flash when the turn signal circuitry of the motor vehicle is activated.

4. The retrofitted light wiring assembly of claim 1, wherein said second diode is connected and oriented so as to allow a turn signal from a turn signal circuitry to pass through the wiring assembly to cause the at least one running board lamp to flash when the turn signal circuitry of the motor vehicle is activated without allowing current from the courtesy lamp system to flow back to the turn signal circuitry of the motor vehicle.

5. A retrofitted vehicle running board light assembly, comprising:
   a running board light assembly provided on a running board on a side of a vehicle, said running board light assembly comprising a part of an existing courtesy lamp system; and
   a wiring assembly detachably coupled to said running board light assembly, said wiring assembly connecting said running board light assembly to a turn signal circuitry of the vehicle such that at least one lamp of the running board light assembly flashes when the turn signal circuitry of the vehicle is activated, wherein said wiring assembly comprises a first diode connected and oriented so as to allow current from a courtesy lamp circuitry of said motor vehicle to pass through the wiring assembly to activate a running board lamp of the courtesy lamp circuitry without allowing a turn signal of said motor vehicle to pass back through the wiring assembly to the courtesy lamp circuitry to cause other lamps of the courtesy lamp circuitry to flash when the turn signal circuitry of the motor vehicle is activated.

6. The retrofitted vehicle running board lighting assembly of claim 5, wherein said wiring assembly comprises a second diode connected and oriented so as to allow a turn signal from the turn signal circuitry to pass through the wiring assembly to cause the running board lamp to flash when the turn signal circuitry of the motor vehicle is activated without allowing current from the courtesy lamp system to flow back to the turn signal circuitry of the motor vehicle.

7. The retrofitted running board of claim 6, wherein said wiring assembly is detachably coupled to said running board light assembly through a pair of male-female couplings.

8. A method of retrofitting an exiting courtesy lamp system of a motor vehicle, said method comprising the steps of:
   providing at least one running board on a side of said motor vehicle;
   electrically connecting a running board signaling wiring assembly to the exiting courtesy lamp system and to a signaling circuitry of the motor vehicle such that at least one lamp on the at least one running board of the motor vehicle flashes when the signaling circuitry of the motor vehicle is activated;

providing a first diode in said running board signaling wiring assembly which is connected and oriented so as to allow current from the courtesy lamp system of said motor vehicle to pass through the wiring assembly to activate the running board lamp of the courtesy lamp system without allowing a turn signal of said motor vehicle to pass through the wiring assembly to the courtesy lamp system to cause other lamps of the courtesy lamp circuitry to flash when the signaling circuitry of the motor vehicle is activated; and providing a second diode in said running board signaling wiring assembly which is connected and oriented so as to allow a rum signal from the signaling circuitry of the motor vehicle to pass through the wiring assembly to cause the running board lamp to flash when the signaling circuitry of the motor vehicle is activated without allowing current from the courtesy lamp system to flow back to the signaling circuitry of the motor vehicle.

9. The method of claim 8, wherein said step of electrically connecting the running board signaling wiring assembly to the exiting courtesy lamp system is performed using male-female connectors without requiring cutting or splicing of any wires.

* * * * *